(12) United States Patent
Zhong

(10) Patent No.: US 10,359,098 B1
(45) Date of Patent: Jul. 23, 2019

(54) HYPO-CYCLOIDAL DIFFERENTIAL

(71) Applicant: SCHAEFFLER TECHNOLOGIES AG & CO. KG, Herzogenaurach (DE)

(72) Inventor: Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/864,442

(22) Filed: Jan. 8, 2018

(51) Int. Cl.
F16H 1/32 (2006.01)
F16H 48/06 (2006.01)

(52) U.S. Cl.
CPC ............... F16H 1/32 (2013.01); F16H 48/06 (2013.01)

(58) Field of Classification Search
CPC . F16H 1/32; F16H 48/06; F16H 48/14; F16H 48/38; F16H 48/40; F16H 2048/385
See application file for complete search history.

(56) References Cited

U.S. PATENT DOCUMENTS

| 3,499,348 | A | 3/1970 | Hartupee |
| 3,791,237 | A | 2/1974 | Kitano et al. |
| 5,197,930 | A * | 3/1993 | Imase ............... F16H 25/06 475/168 |
| 7,147,582 | B2 | 12/2006 | Mingishi et al. |
| 7,749,123 | B2 * | 7/2010 | Miao ............... F16H 25/06 475/166 |
| 8,221,278 | B2 | 7/2012 | Biermann et al. |
| 10,184,547 | B2 | 1/2019 | Fecko |
| 2006/0089227 | A1 | 4/2006 | Fanselow et al. |
| 2008/0188341 | A1 | 8/2008 | Miao et al. |
| 2011/0082000 | A1 | 4/2011 | Makino |
| 2014/0018203 | A1 * | 1/2014 | Huang ............... F16H 1/32 475/168 |
| 2017/0152931 | A1 | 6/2017 | Noguchi et al. |

FOREIGN PATENT DOCUMENTS

JP 2016031081 A 3/2016

OTHER PUBLICATIONS

International Search Report and Written Opinion for Application No. PCT/US2018/061967, dated Mar. 12, 2019, 11 pages.
Notice of Allowance for U.S. Appl. No. 15/864,460 dated Apr. 3, 2019, 13 pages.

* cited by examiner

Primary Examiner — Mark J Beauchaine
(74) Attorney, Agent, or Firm — Brooks Kushman P.C.

(57) ABSTRACT

A cycloidal differential includes a driven body, first and second cycloidal drives, and a coupling plate. The first cycloidal drive is disposed on a first side of the driven body and has a first input member rotationally fixed to the driven body and a first output member configured to connect with a first half shaft. The second cycloidal drive is disposed on a second side of the driven body and has a second input member rotationally fixed to the driven body and a second output member configured to connect with a second half shaft. The coupling plate is supported for rotation within the driven body and is connected to each of the first and second cycloidal drives.

20 Claims, 4 Drawing Sheets

HYPO-CYCLOIDAL DIFFERENTIAL

TECHNICAL FIELD

The present disclosure relates to differentials for vehicles and more specifically to cycloidal differentials that include a pair of cycloidal drives arranged to allow independent rotation of the left and right wheels.

BACKGROUND

Cycloidal drives are commonly used as speed-reducer mechanisms. A typical cycloidal drive includes an input shaft having an eccentric end connected to a cycloidal disk via an eccentrically mounted bearing. The disk includes a plurality of lobes that intermesh with ring pins circumferentially surrounding the disk. The ring pins are typically stationary with the housing of the speed reducer. An output shaft includes an array of circumferentially arranged rollers that are received within holes defined in the cycloidal disk. The input shaft drives the disk in an eccentric, cycloidal motion. Motion is transferred from the disk to the output shaft via the plurality of rollers. The eccentric, cycloidal motion of the disk reduces the speed between the input shaft and the output shaft according to the number of lobes, holes, pins, and rollers. The difference between the number of rollers and the number of lobes is usually one, and the number of lobes usually matches the number of pins.

SUMMARY

According to one embodiment, a cycloidal differential includes a driven body, first and second cycloidal drives, and a coupling plate. The first cycloidal drive is disposed on a first side of the driven body and has a first input member rotationally fixed to the driven body and a first output member configured to connect with a first half shaft. The second cycloidal drive is disposed on a second side of the driven body and has a second input member rotationally fixed to the driven body and a second output member configured to connect with a second half shaft. The coupling plate is supported for rotation within the driven body and is connected to each of the first and second cycloidal drives.

According to another embodiment, a cycloidal differential includes a driven body and a first cycloidal drive having a first input member rotationally fixed to the driven body and a first output member configured to connect with a first half shaft. The differential further includes a second cycloidal drive having a second input member rotationally fixed to the driven body and a second output member configured to connect with a second half shaft. A coupling plate is sandwiched between the first and second drives and is connected to each of the first and second cycloidal drives.

According to yet another embodiment, a cycloidal differential includes a gear and a coupling plate supported for rotation within the gear. The differential further includes a first cycloidal drive at least partially disposed within the gear. The first cycloidal drive has a first cycloidal cam defining lobes, holes, and a bore, and first rollers attached to the coupling plate in a circumferential arrangement and engaging with the lobes. The drive further has first pins circumferentially arranged and rotationally fixed to the gear. Each of the first pins is disposed in one of the holes. A first drive shaft has an eccentric end disposed in the bore of the first cam. The differential also includes a second cycloidal drive at least partially disposed in the within the gear and having second rollers attached to the gear in a circumferential arrangement. The second drive further has a second cycloidal cam defining lobes, holes, and a bore. The second cam is disposed within the gear such that the lobes engage with the second rollers. Second pins, of the second drive, are attached to the coupling plate in a circumferential arrangement and are disposed in the holes of the second cycloidal cam. A second drive shaft has an eccentric end disposed in the bore of the second cam.

DETAILED DESCRIPTION

Figure 1:
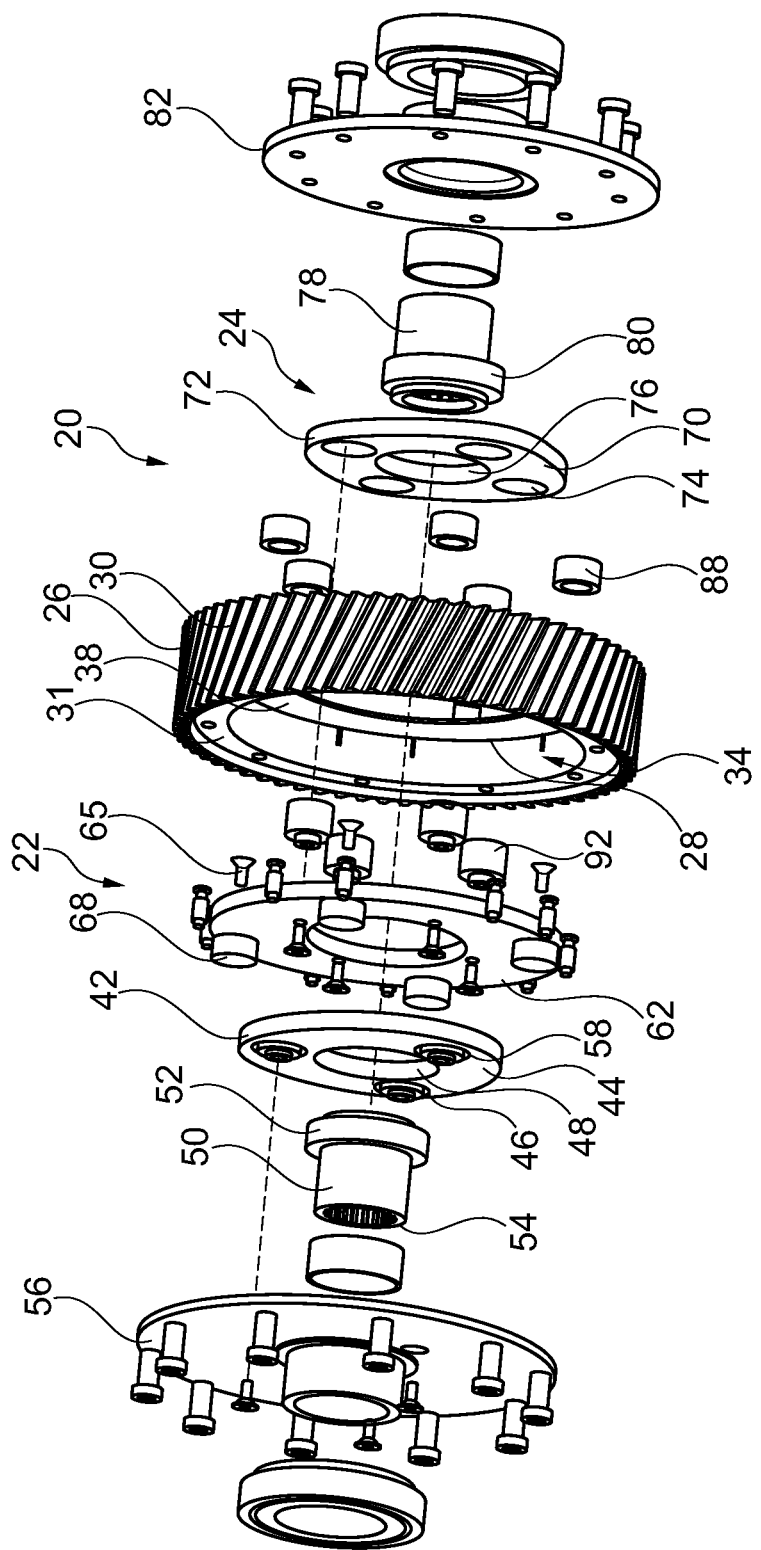
FIG. 1 is an exploded perspective view of a cycloidal differential.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may include a differential on a driven axle to multiply torque of the powertrain and/or allow independent rotation of the left and right driven wheels during cornering. Differentials include a housing supported under the vehicle and have left and right connections configured to receive left and right half shafts of the driven axle. The half shafts transmit torque from the differential to the driven wheels. Used herein "half shaft" refers to any shaft that transmits power from a differential to a driven wheel.

Many types of differentials are known including bevel-gear differentials and spur-gear differentials. These differentials include a gear train disposed within the differential case in order to transmit power from the driveshaft to the half shafts. These types of differentials tend to be bulky requiring a sizable packaging space. The following figures and related text describe a completely different type of differential that does not include a gear train and instead includes a pair of cycloidal drives coupled in tandem. This type of differential is referred to herein as a "cycloidal differential." Cycloidal differentials are compact and require less packaging space on the vehicle than traditional differentials.

Referring to FIGS. 1 through 4, a cycloidal differential 20 includes a driven body that is the power-receiving element of the differential. The driven body may be operably coupled to a driveshaft. The driven body may be a gear such as ring gear 26. Alternatively, the driven body may be a bevel gear, a chain-driven sprocket, a belt-driven pulley, or the like. In the illustrated embodiment, the differential 20 includes a first cycloidal drive 22 and a second cycloidal drive 24 disposed on opposing sides of a ring gear 26. The ring gear 26 includes a hub 28 and gear teeth 30. The gear teeth 30 may mesh with gear teeth of a pinion driven by a driveshaft. The hub 28 includes a first end face 31 and a second end face 32 disposed on opposite sides of the hub 28. The hub 28 may define a first recess portion 34 and a second recess portion 36 that are separated by an intermediate wall 38. The first cycloidal drive 22 is at least partially disposed in the first recess portion 34, and the second cycloidal drive 24 is at least partially disposed in the second recessed portion 36. The intermediate wall 38 defines a central bore 40 allowing components to extend through the ring gear 26 and connect between the first and second drives 22, 24.

Each of the cycloidal drives 22, 24 have an output member configured to connect with one of the half shafts to supply power from the differential 20 to the driven wheels. The differential 20 includes a coupling element that interconnects the first and second cycloidal drives 22, 24. The differential 20 is configured so that the output members, the coupling element, and the ring gear 26 rotate at the same speed when the vehicle is traveling in a straight line. During a turn, the outside output member rotates faster than the ring gear 26, the inside output member rotates slower than the ring gear 26, and the coupling element rotates slower than both of the output members making the differential 20 a hypo-cycloidal differential.

The first cycloidal drive 22 includes a cycloidal cam 42 having lobes 44 forming the circumferential perimeter of the cam and circular holes 46 circumferentially arranged and extending through the cam 42. The number of lobes 44 and the number of holes 46 may be equal. In the illustrated embodiment, the cam 42 has three lobes and three holes. The output member of the first drive 22 is coupled with the cam 42. The output member may be a driveshaft 50 that includes an eccentric end 52 received in a bore 48 defined in the cam 42. A bearing may be interposed between the end 52 and the bore 48. The driveshaft 50 is supported by an endplate 56 attached to the first end face 31 of the ring gear 26. The driveshaft 50 extends through the hub of the endplate 56 and includes an internal spline 54 enabling the driveshaft 50 to connect with the half shaft.

Pins 58 of the first drive 22 may be fastened to the endplate 56. The pins 58 are rotationally fixed to the ring gear 26 and thus are the input members of the first cycloidal drive 22. The pins 58 are circumferentially arranged on the endplate 56 so that the pins 58 are received within the holes 46 of the cam 42. The diameter of the pins 58 is less than the diameter of the holes 46 to facilitate the eccentric, cycloidal motion of the cam 42.

In the illustrated embodiment, the coupling element is a coupling plate 62, which may be an annulus. The coupling plate 62 is received in the first recess portion 34 such that a circumferential surface of the plate 62 faces a race surface 64. The coupling plate 62 may be concentric with the ring gear 26 and is independently rotatable relative to the ring gear 26. A plurality of bearings 66 may be disposed on the race surface 64 and support the coupling plate 62 for rotation within the hub 28.

Rollers 68 of the first drive 22 may be fastened to a first side of the coupling plate 62. The rollers 68 are circumferentially arranged on the coupling plate 62 to engage with the lobes 44. The roller 68 may be circular and have a smooth outer surface. The outer surface of the cam 42 may also be smooth. Bearings (not shown) may be provided between the rollers 68 and the fasteners 65 to reduce friction. The drive 22 may include one more roller 68 than pins 58. In the illustrated embodiment, the drive 22 includes three pins 58 and four rollers 68.

Similar to a planetary gear set, if one of the pins 58, driveshaft 50, and coupling plate 62 is held static, then the other two components will rotate relative to each other at different speeds. For example, if the pins 58 are held stationary, the coupling plate 62 and the driveshaft 50 will rotate in a same direction with the driveshaft 50 rotating faster than the coupling plate 62. In the illustrated embodiment, the driveshaft 50 rotates four times faster than the coupling plate 62.

The second cycloidal drive 24 includes a cycloidal cam 70 having lobes 72, circular holes 74, and a bore 76. In the illustrated embodiment, the cam 70 includes four lobes and four holes. The cam 70 is supported on a driveshaft 78 (which is the output member of the second drive 24). The driveshaft 78 has an eccentric end 80 received in the bore 76. An eccentric roller bearing may be interposed between the cam and the driveshaft. The driveshaft 78 is supported by an endplate 82 that is attached to the second end face 32 of the ring gear 26 by one or more fasteners or other type of connection. The driveshaft 78 may include internal splines 84 to connect with the half shaft.

The second cycloidal drive 24 also includes a plurality of rollers 88 that are attached to the hub 28. The rollers 88 may be fastened to the hub 28 by screws. In one embodiment, the rollers 88 are needle bearings. The hub 28 may define pockets 90 for receiving the rollers 88. The rollers 88 are circumferentially arranged on the hub 28 to receive the cam 70, which is disposed within the second recess portion 36. The second drive 24 is configured such that the rollers 88 engage with the lobes 72 allowing the eccentric, cycloidal rotation of the cam 70. The number of rollers 88 may be one more than the number of lobes 72. In the illustrated embodiment, the drive 24 includes four lobes 72 and five rollers 88. The rollers 88 are attached to the ring gear 26 and are the input member of the second drive 24.

Pins 92 of the second drive 24 may be attached to a second side of the coupling plate 62 by fasteners or the like. The number of pins 92 may be equal to the number of lobes 72 and one less than the number of rollers 88. In the illustrated embodiment, the second drive includes four pins 92. The pins 92 extend through the central bore 40 to be received within the holes 74 of the cam 70. The diameter of the pins 92 is smaller than the holes 74 allowing the eccentric, cycloidal rotation of the cam 70.

If one of the rollers 88, driveshaft 78, and coupling plate 62 is held static, then the other two components will rotate relative to each other at different speeds. For example, if the rollers 88 are held static, the coupling plate 62 and the driveshaft 78 will rotate in opposite directions with the driveshaft 78 rotating faster than the coupling plate 62. In the illustrated embodiment, the driveshaft 78 rotates four times faster than the coupling plate 62.

The rollers 68 of the first drive 22 and the pins 92 of the second drive 24 are attached to the coupling plate 62 to interconnect the drives 22, 24. By connecting a component of each of the drives 22, 24 to the coupling plate 62, the two driveshafts 50, 78 are coupled as one. The number of rollers 68 is equal to the number of pins 92 to ensure an equal speed ratio between both the driveshafts 50, 78. In the illustrated embodiment, there are four rollers 68 and four pins 92. Thus, the speed ratio between the driveshaft 50 and the coupling plate 62 is 4:1, and the speed ratio between the driveshaft 78 and the coupling plate 62 is also 4:1. The speed ratios can be adjusted by increasing or decreasing the number of rollers, pins, holes, and lobes with increasing numbers increasing the speed ratio.

In the illustrated embodiment, the first cycloidal drive 22 is a third-order drive (cam 42 has three lobes) and the second cycloidal drive 24 is a fourth-order drive (cam 70 has four lobes). By having one of the drives of m order and the other of m+1 order, the speed ratios between the output members are equal. While illustrated as having a third-order drive and a fourth-order drive, the differential 20 may have any combination of an m order drive and an m+1 order, where m is greater than or equal to 2.

Figure 2:
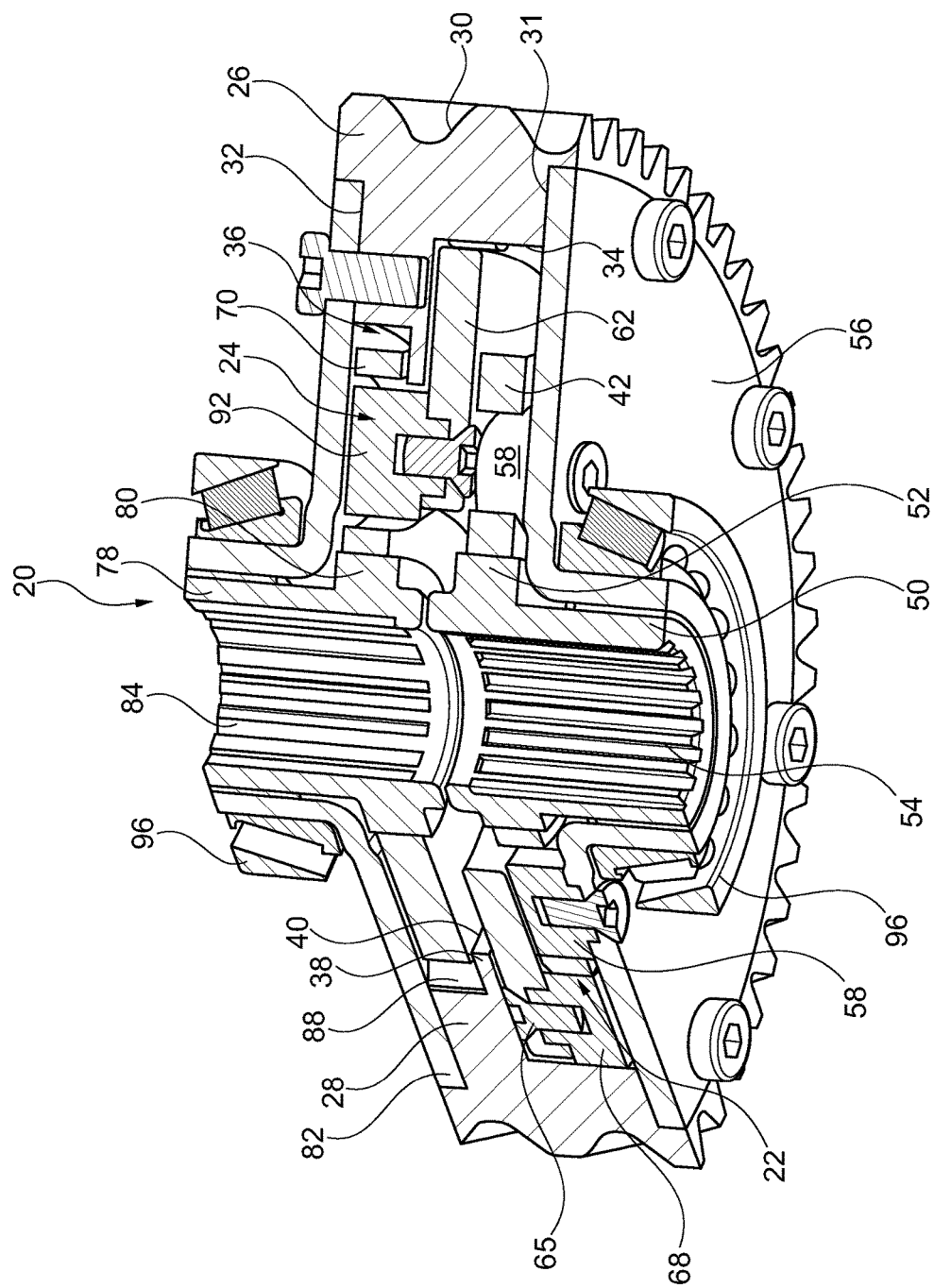
FIG. 2 is a cross-sectional perspective view of the cycloidal differential.
Figure 4:
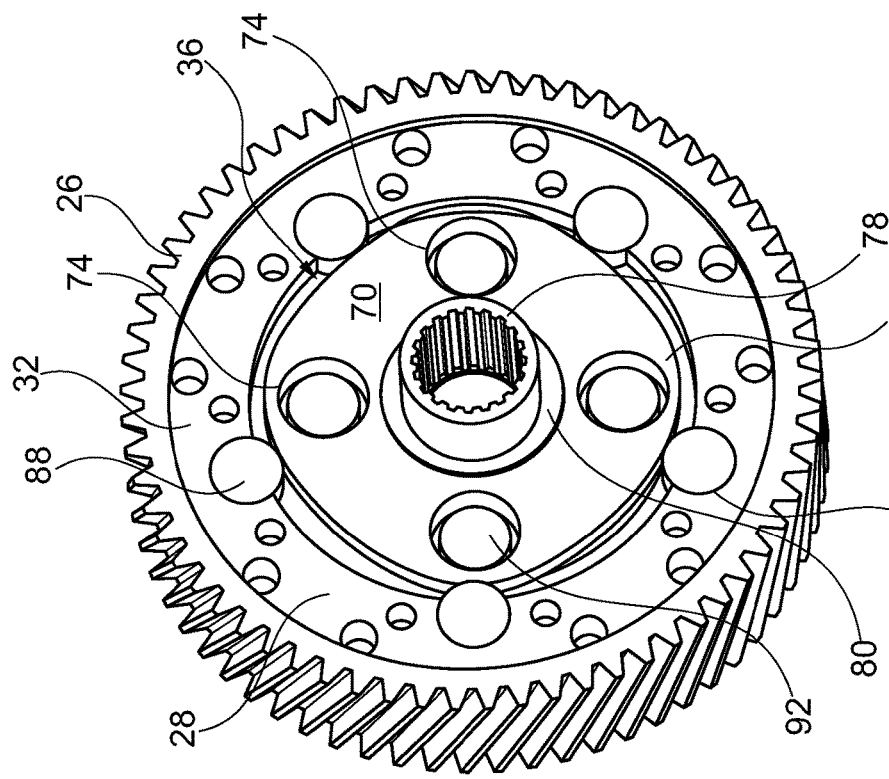
FIG. 4 is a perspective view of a second side of the cycloidal differential with many components omitted for illustrative purposes.
Figure 3:
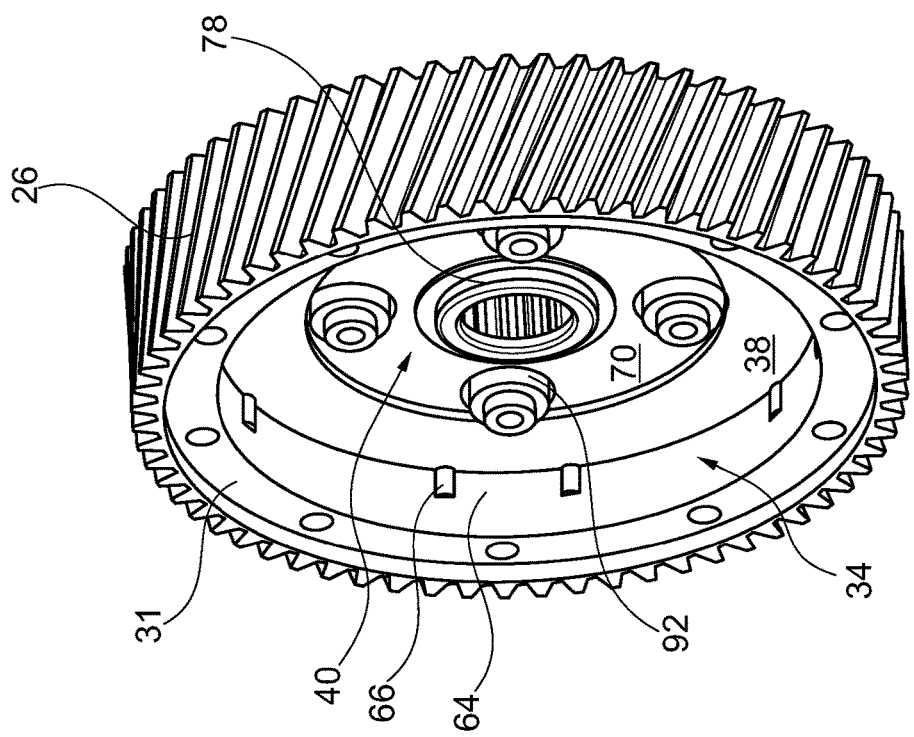
FIG. 3 is a perspective view of a first side of the cycloidal differential with many components omitted for illustrative purposes.

Referring to FIG. 2, the cycloidal drives allow for a very compact differential. The entire assembly with the exception to the shafts may be completely disposed between the endplates 56, 82 and within the hub 28 of the ring gear 26. In a traditional bevel-gear differential, a carrier is attached to the bevel gear and axially extends significantly past a footprint of the bevel gear. This enlarges the differential housing and requires vehicle designers to provide a much larger packaging space for the bevel-gear differential. In contrast, the differential 20 is supported in the case by a pair of bearings 96. The bearings 96 are in close proximity to the ring gear 26. The differential case (not shown) need not extend past the bearings 96. Thus, a much smaller packaging space is required for the differential 20 as compared to traditional differentials.

Figure 5A:
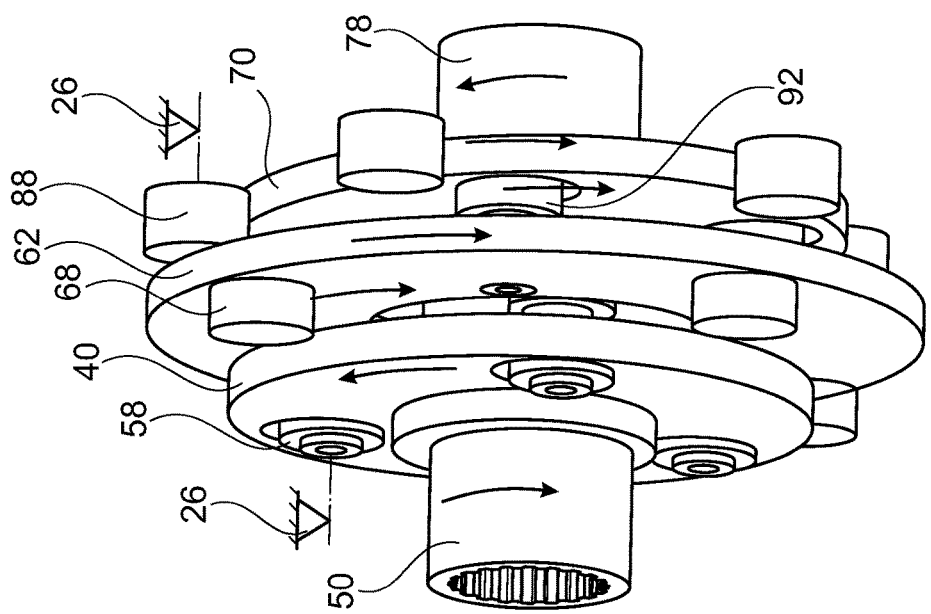
FIG. 5A is a diagrammatical view of the cycloidal differential showing component rotation during straight-line driving.

In FIG. 5A the dashed arrows indicate would be relative rotation between the illustrated parts—not actual relative rotation. (As will be explained below, the entire assembly is locked relative to each other and rotates in unison with the ring gear.) The differential 20 is shown with the driveshafts 50 and 78 rotating at the same speed (in the clockwise direction) such as during straight-line driving of the vehicle. The ring gear 26 (not shown) rotates at the same speed as the driveshafts when the driveshafts rotate at the same speed. During straight-line driving, the first drive 22 urges the rollers 68 to revolve in the clockwise direction and the second drive 24 urges the pins 92 to revolve in the counterclockwise direction about a centerline of the differential. Since the rollers 68 and the pins 92 are attached to the same coupling plate 62, these revolutions in opposite directions are prevented. Thus, the coupling plate 62 locks the first and second drives 22, 24 relative to each other causing the driveshaft 50 and the driveshaft 78 to rotate in the same direction, which is in unison with the ring gear 26. The coupling plate 62 locks the driveshafts 50, 78 due to an equal number of rollers 68 and pins 92. This will be described in more detail below.

Assuming that the ring gear 26 rotates clockwise, the pins 58 revolve clockwise about the centerline of the differential at the same speed as the ring gear 26. Rotation of the pins 58 about their axes urges a counterclockwise eccentric, cycloidal motion of the cam 42. The counterclockwise eccentric, cycloidal motion of the cam 42 urges the driveshaft 50 to rotate clockwise, but the ground prevents rotation of the driveshaft 50 relative to the cam 42. The lobes 44 of the cam engage with the rollers 68 causing the coupling plate 62 to rotate in unison with the ring gear 26 and the driveshaft 50.

In the second drive 24, the rollers 88 revolve in the clockwise direction according to rotation of the ring gear 26. The revolution of the rollers 88 urges a counterclockwise eccentric, cycloidal motion of the cam 70. The counterclockwise eccentric, cycloidal motion of the cam 70 urges the driveshaft 78 to rotate clockwise, but the ground prevents rotation of the driveshaft 50 relative to the cam 70. The counterclockwise eccentric, cycloidal motion of the cam 70 urges pins 92 to revolve counterclockwise. The coupling plate 62 prevents revolution of the pins 92 causing the differential 20 to lock up, i.e., none of the individual components of the differential 20 rotate relative to each other. Instead, all of the individual components rotate/revolve clockwise with the ring gear 26. Thus, when the vehicle is driving in a straight line, the driveshafts 50, 78, coupling plate 62, and the ring gear 26 rotate at the same speed and in the same direction.

Figure 5B:
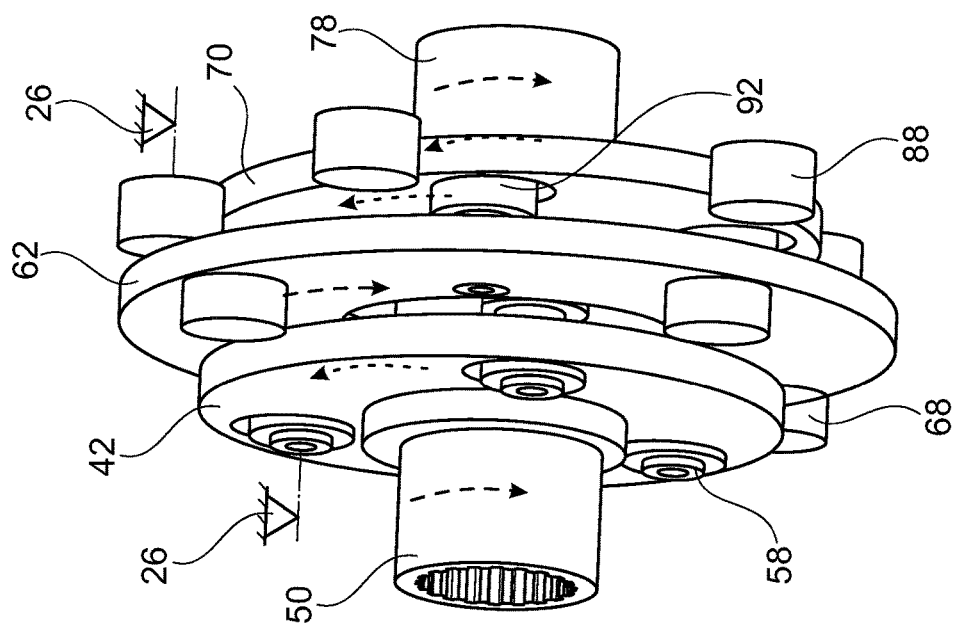
FIG. 5B is a diagrammatical view of the cycloidal differential showing component rotation during cornering.

In FIG. 5B the solid arrows indicate actual relative rotation between the illustrated parts—not overall rotation. (The entire illustrated assembly rotates clockwise with the ring gear.) The differential 20 is shown during cornering of the vehicle with the driveshafts 50 and 78 rotating at the different speeds. The driveshaft 78 is connected to the inner wheel, and the driveshaft 50 is connected to the outer wheel.

Normally, rotation is transferred from the ring gear 26 into the pins 58 of the first drive 22 and into the rollers 88 of the second drive 24 causing the driveshafts 50 and 78 to rotate. During a corner, however, the driveshaft 50 is rotating faster than the ring gear 26 and is inputting rotation into the differential 20. The clockwise rotation of the driveshaft 50, i.e., increased angular speed, causes counterclockwise eccentric, cycloidal motion of the cam 42. Since the pins 58 are rotationally fixed to the ring gear 26, the lobes 44 urge the rollers 68 to revolve clockwise around the center line causing the coupling plate 62 to rotate clockwise. The cam 42 creates a speed reduction and the coupling plate 62 rotates slower than the driveshaft 50. In the illustrated embodiment, the coupling plate 62 rotates four times slower relative to the driveshaft 50.

Rotation of the coupling plate 62 is input into the second cycloidal drive 24 via the pins 92 being rotationally fixed to the coupling plate 62. Since the number of rollers 68 and pins 92 is the same, the driveshaft 78 has the same speed relationship between the coupling plate 62 as the driveshaft 50 albeit in the counterclockwise direction due to the pins 92 being attached to the coupling plate rather than the rollers 68. The clockwise revolution of the pins 92 cause the cam 70 to rotate in the clockwise direction, which in turn, cause the driveshaft 78 to rotate in the counterclockwise direction. The counterclockwise direction of the driveshaft 78 is being used as a relative term meaning that the driveshaft 78 is rotating slower than the ring gear 26 and the driveshaft 50. In reality, both of the driveshafts 50 and 78 rotate in the same direction, which is also the same direction of rotation as the ring gear, but at different speeds.

This disclosure is not limited to the illustrated embodiments. The cycloidal drives of the differential can be rearranged to form other types of cycloidal differentials. Applicant's co-pending applications, U.S. patent application Ser. No. 15/864,460 and U.S. patent application Ser. No. 15/864,492, filed on the same day as this disclosure, which are incorporated in their entirety by reference herein, disclose other types of cycloidal differentials.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A cycloidal differential comprising:
   a driven body;
   a first cycloidal drive disposed on a first side of the driven body and including a first input member rotationally fixed to the driven body and a first output member configured to connect with a first half shaft;
   a second cycloidal drive disposed on a second side of the driven body and including a second input member rotationally fixed to the driven body and a second output member configured to connect with a second half shaft; and
   a coupling plate supported for rotation within the driven body and connected to each of the first and second cycloidal drives.

2. The cycloidal differential of claim 1, wherein the first cycloidal drive is configured to urge the coupling plate to rotate in a first direction in response to the first output member rotating in the first direction, and the second cycloidal drive is configured to urge the coupling plate to rotate in a second direction in response to the second output member rotating in the first direction.

3. The cycloidal differential of claim 2, wherein the first and second cycloidal drives are configured to rotate the coupling plate in the first direction relative to the driven body in response to the first output member rotating faster than the second output member.

4. The cycloidal differential of claim 1, wherein the first drive further includes a first cam defining holes and the first input member is an arrangement of pins disposed in the holes.

5. The cycloidal differential of claim 4, wherein the second drive further includes a second cam having lobes and the second input member is an arrangement of rollers in rolling engagement with the lobes.

6. The cycloidal differential of claim 1, wherein the first drive further includes an arrangement of rollers attached to the coupling plate, and the second drive further includes an arrangement of pins attached to the coupling plate, wherein the amount of rollers and pins is equal.

7. The cycloidal differential of claim 6, wherein the second drive further includes a cam seated on the second output member and defining holes that receive the pins.

8. The cycloidal differential of claim 1, wherein each of the outputs members is a shaft that includes a first end configured to connect with a respective one of the first and second half shafts and a second end that is eccentric.

9. The cycloidal differential of claim 8, wherein the first drive further includes a first cam seated on the eccentric second end of the first output member, and the second drive further includes a second cam seated on the eccentric second end of the second output member.

10. The cycloidal differential of claim 9, wherein the first drive further includes rollers in rolling engagement with lobes of the first cam and attached to the coupling plate, and the second drive further includes pins in rolling engagement with interior portions of the second cam and attached to the coupling plate.

11. The cycloidal differential of claim 1, wherein the first and second cycloidal drives are configured so that the coupling plate rotates slower than the driven body in response to the first and second output members rotating at different speeds.

12. The cycloidal differential of claim 11, wherein the first and second drives are further configured so that the coupling plate is rotationally fixed to the driven body in response to the first and second output members rotating at the same speed.

13. The cycloidal differential of claim 1 further comprising an endplate connected to the first side of the driven body, wherein the first input member is attached to the endplate.

14. The cycloidal differential of claim 1, wherein the driven body is a gear.

15. A cycloidal differential comprising:
    a driven body;
    a first cycloidal drive including a first input member rotationally fixed to the driven body and a first output member configured to connect with a first half shaft;
    a second cycloidal drive including a second input member rotationally fixed to the driven body and a second output member configured to connect with a second half shaft; and
    a coupling plate sandwiched between the first and second drives and connected to each of the first and second cycloidal drives.

16. The cycloidal differential of claim 15, wherein the first input member is an arrangement of pins, and the second input member is an arrangement of rollers.

17. The cycloidal differential of claim 15, wherein the first drive includes an arrangement of rollers attached to the coupling plate, and the second drive includes an arrangement of pins attached to the coupling plate, wherein the amount of pins and rollers is equal.

18. The cycloidal differential of claim 15, wherein the first and second output members are shafts that each has an eccentric end.

19. The cycloidal differential of claim 15, wherein the first cycloidal drive further includes a first cam defining holes and the first input member is an arrangement of pins disposed in the holes, and wherein the second cycloidal drive further includes a second cam defining lobes and the second input member is an arrangement of rollers in rolling engagement with the lobes.

20. A cycloidal differential comprising:
    a gear;
    a coupling plate supported for rotation within the gear;
    a first cycloidal drive at least partially disposed within the gear, the first cycloidal drive including:
      a first cycloidal cam defining lobes, holes, and a bore,
      first rollers attached to the coupling plate in a circumferential arrangement and engaging with the lobes,
      first pins circumferentially arranged and rotationally fixed to the gear, wherein each of the first pins is disposed in one of the holes, and
      a first drive shaft including an eccentric end disposed in the bore of the first cam; and
    a second cycloidal drive at least partially disposed in the within the gear and including:
      second rollers attached to the gear in a circumferential arrangement,
      a second cycloidal cam defining lobes, holes, and a bore, the second cam being disposed within the gear such that the lobes engage with the second rollers, second pins attached to the coupling plate in a circumferential arrangement and disposed in the holes of the second cycloidal cam, and a second drive shaft including an eccentric end disposed in the bore of the second cam.

\* \* \* \* \*